May 7, 1929.    T. P. CONNOLLY    1,712,455
AWNING CONTROLLING MECHANISM
Filed Sept. 8, 1925
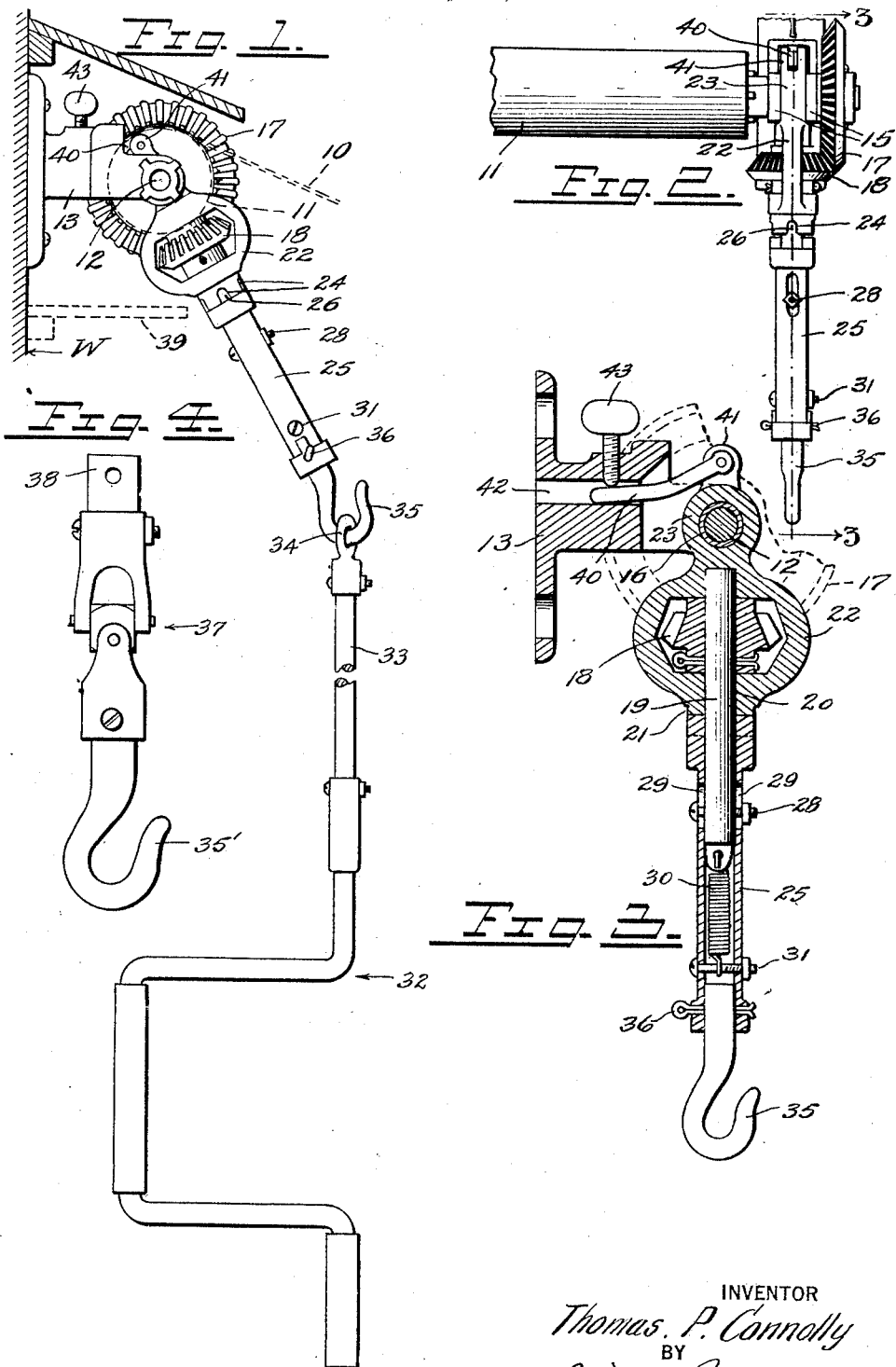
INVENTOR
Thomas P. Connolly
BY
Pierre Barnes
ATTORNEY Patented May 7, 1929.

1,712,455

UNITED STATES PATENT OFFICE.

THOMAS P. CONNOLLY, OF SEATTLE, WASHINGTON.

AWNING-CONTROLLING MECHANISM.

Application filed September 8, 1925. Serial No. 54,959.

This invention relates to awnings such as used, for example, in front of stores or the like, wherein the fabric or awning proper, is wound upon or unwound from a roller by means of manually actuated mechanism.

The object of my invention is the provision of simple and efficient mechanism whereby the awning roller is conveniently turned in one rotary direction to permit the awning being unwrapped and extended into operative position, said mechanism also serving to rotate the roller in the opposite direction for winding the awning thereabout.

Another object of the invention is the provision of devices for automatically locking the awning controlling mechanism for positively securing the roller in selected rotary positions.

More specific objects and advantages of the invention will appear in the following description.

The invention consists in the novel construction, adaptation and combination of devices hereinafter described and claimed.

In the accompanying drawing,—

Figure 1 is a side elevation partly in section of devices embodying my invention, shown applied, the awning and roller being indicated by dotted lines. Fig. 2 represents a front elevation of Fig. 1 with parts broken away and other parts omitted. Fig. 3 is a transverse vertical section taken substantially on line 3—3 of Fig. 2. Fig. 4 is an elevational view of hook attachment which may be substituted for the one shown in the preceding views.

In said drawing, reference number 10 represents an awning fabric, hereinafter designated as the awning, and 11 is the roller member about which the awning is wound.

The awning member 11 may be of wood or other suitable material having end journals which are rotatably mounted in supports such as brackets secured to the wall W of a building.

As but one of said journals and supports are considered in the present invention, the others are not illustrated herein.

The journal shown is in the nature of a gudgeon, indicated by 12, which is journaled in a support 13 which is preferably bifurcated, the bifurcations 15 being spaced apart as shown in Fig. 2. The bearings for the journal 12 are afforded by aligned apertures provided in said bifurcations and, by preference, within a bushing 16 in the nature of a tube which is seated in said apertures and extends across the gap between the bifurcations. At the opposite side, preferably, of the bracket from the roller member 11, there is rigidly secured to said journal a toothed bevel gear 17 which is in continuous mesh with the teeth of a bevel pinion 18. This pinion is mounted rigidly upon a stub shaft 19 which is journaled, as at 20, in the tubular extension 21 of a frame 22, said frame having an apertured lug element 23 which extends into the gap between the bracket bifurcations 15.

A shown, the lug element 23 of said frame is mounted upon the tube 16 thereby permitting the frame to be swung about the axis of the roller journal. The outer end of the frame extension is provided with a plurality of circumferentially spaced notches 24 to enable said extension to serve as a clutch member with respect to a complementary clutch member 25 in the nature of a sleeve having teeth 26 which are engageable within said notches for coupling the sleeve 25 with the frame.

Said sleeve is splined or connected to the shaft, as shown, by means of a key or pin 28 extending diametrically through the latter into longitudinal slots 29 provided in the sleeve thereby rotatably securing the shaft and sleeve together permitting axial movements of the sleeve for removably engaging the teeth thereof within the notches of the frame 22.

The sleeve, or clutch member 25, is yieldingly held in couple with the frame by means of an extensible spring 30 positioned within the sleeve; one end of the spring being connected to the sleeve through the medium of a pin 31 and its other end is connected to the shaft as shown in Fig. 3.

Included in the invention is a means for operating the above described mechanism, such means being employed to withdraw the sleeve from its engagement with the frame to effect the unlocking of the shaft and subsequently turning the sleeve and shaft to impart through said gears motion to the roller 11 in either rotary direction, selectively. For which purposes I employ a tool, herein illustrated as a crank brace 32 (Fig. 1) secured to the end of a rod 33 whose other end is provided with loop 34. This loop is engageable with a hook member 35 which is rigidly secured to the sleeve as by means of a split pin 36, as shown in Figs. 1, 2, and 3.

Instead of securing the hook 35 rigidly to the sleeve, universal joint devices 37, see Fig. 4, may be utilized between the hook, indicated by 35′ in Fig. 4, and a plug element 38 which is adapted to be secured to the sleeve as by means of a pin.

The universal joint connection between the hook 35′ and the sleeve is applicable where the awning roller member is located within a housing having a floor member such as represented by dotted lones 39 (Fig. 1), for example, when the operator desires to actuate the mechanism from the ground in close proximity with the building wall.

Provision is made for securing the frame 22 in selected angular positions rotatively about the axis of the roller 11. The means shown for this purpose consists of a connecting rod 40 having one of its ends connected to an arm 41 of said frame and its other end extending into a pocket 42 of the bracket 13 to be engaged by the end of a binding screw 43 which takes in a threaded hole of the bracket.

Normally the sleeve 25 which is rigid with the shaft 19 is in engaged relation with the frame 22 thereby preventing the roller 11 turning. To turn the roller for regulating the awning, the operator with the actuating tool engages the loop 34 thereof with the hook 35 of the controlling mechanism, first exercises an end pull to the tool to dislodge sleeve from its locked connection with the frame 22 and then rotates the tool to transmit rotary movement to the shaft, and gears 18—17 to rotate the roller.

When the awning is suitably regulated, the operator relieves the tool of any end pull, whereupon the spring 30 acts to effect automatically endwise movement of the sleeve into engaged relation with the frame 22.

The construction and operation of the invention will be understood from the foregoing description taken in connection with the illustrated embodiment.

While I have described the invention, however, with relation to a particular embodiment, I do not wish to be understood as confining myself specifically thereto except as limited by the following claims.

What I claim, is :—

1. In awning operating and locking mechanism, the combination of a support, an awning member journaled in said support, a frame depending from and pivotally connected to said support, a toothed gear rotatable with said member, a toothed gear pinion in mesh with said gear, a clutch member rotatably connected to said pinion, said clutch member being engageable with the frame to secure the awning member from rotating, and actuating means adapted to control the clutch member and also serving to rotate the awning member through the medium of said gears after the clutch member is disengaged from said frame.

2. In awning operating and locking mechanism, the combination of a support, an awning member journaled in said support, a hollow frame depending from said support, a toothed gear rotatable with said member, a toothed gear pinion in mesh with said gear, a clutch member rotatably connected to said pinion, a spring housed within said hollow frame and tending to maintain the clutch member in engaged relation with said frame to secure the gears and the awning member from rotating, and actuating means detachably connected with said clutch for successively disengaging the clutch member from the frame and effecting the rotation of the awning member in either rotary direction, selectively.

3. In mechanism of the class described, a driven gear and a driving gear in continuous mesh with each other, a support for said driving gear, a shaft for the driving gear, a frame pivotally connected to said support and provided with journal bearings for said shaft, a clutch member mounted upon said shaft to rotate therewith, said member being arranged for movement axially of the shaft into and out of position to couple the shaft to the frame against rotary movement, a spring acting to normally retain said clutch member in its engaged relation with the frame, and operating means to effect the disengagement of the sleeve from the frame, said means also serving to impart rotary movement to the shaft for actuating the gears.

4. The combination with an awning member having a journal extending from an end thereof, a support for said journal, and a bevel gear rigidly mounted upon said journal, of a frame supported by said support, clutch elements rigid with the frame, a shaft journaled in said frame, a bevel gear rigidly mounted upon the shaft and in continuous mesh with the aforesaid gear, a second clutch member mounted to rotate with said shaft and arranged for relative movement axially thereof, a spring tending to retain the clutch member in engaged relation with the clutch elements of the frame, and a single means adapted to be detachably engaged with said clutch member for effecting the disengagement of the latter from the frame and the rotation of the gears to impart rotary motion to said awning member.

5. In mechanism of the class described, the combination with an awning member, and a support in which said member is journaled, of a frame depending from said support, said frame being rotatable about the axis of said awning member, a shaft journaled in said frame, gear connections between said member and the shaft, a clutch member rotatable with the shaft and arranged for relative longitudinal movement with respect thereto, said clutch member being adapted to be detachably engaged with the frame for securing the shaft thereto against rotary movement, a means to yieldably retain said clutch member in its engaged relation with the frame, and means to effect axial and rotary movements successively to said clutch member for operating said gears to rotate said awning member.

Signed at Seattle, Washington, this 22nd day of August, 1925.

THOMAS P. CONNOLLY.